(12) United States Patent
Winter

(10) Patent No.: US 8,172,244 B2
(45) Date of Patent: May 8, 2012

(54) REAR AXLE FOR A MOTOR VEHICLE

(75) Inventor: Ingo Winter, Isenbütel (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 12/599,526

(22) PCT Filed: Apr. 19, 2008

(86) PCT No.: PCT/EP2008/003166
§ 371 (c)(1),
(2), (4) Date: Jul. 20, 2010

(87) PCT Pub. No.: WO2008/138451
PCT Pub. Date: Nov. 20, 2008

(65) Prior Publication Data
US 2010/0276903 A1      Nov. 4, 2010

(30) Foreign Application Priority Data

May 12, 2007    (DE) .......................... 10 2007 022 283

(51) Int. Cl.
*B60G 11/16*    (2006.01)
*B60G 21/05*    (2006.01)

(52) U.S. Cl. .... 280/124.107; 280/124.116; 280/124.166

(58) Field of Classification Search ........... 280/124.106, 280/124.107, 124.116, 124.166, 124.167, 280/124.177, 124.179; 267/273, 293
See application file for complete search history.

(56) References Cited

U.S. PATENT DOCUMENTS

| | | | |
|---|---|---|---|
| 3,964,764 A * | 6/1976 | Rickardsson | 280/124.116 |
| 4,078,830 A | 3/1978 | Urushiyama et al. | 280/688 |
| 4,085,945 A * | 4/1978 | Bicht et al. | 280/788 |
| 4,334,696 A * | 6/1982 | Bergstrom | 280/124.104 |
| 4,433,744 A | 2/1984 | Muhlbacher | 180/65 |
| 4,458,917 A * | 7/1984 | Maru et al. | 280/124.106 |
| 5,409,254 A * | 4/1995 | Minor et al. | 280/124.166 |
| 6,179,328 B1 | 1/2001 | Kawagoe et al. | 280/788 |

(Continued)

FOREIGN PATENT DOCUMENTS

AT          386806         10/1988

(Continued)

OTHER PUBLICATIONS

International Search Report and Written Opinion for Application No. PCT/EP2008/003166 (12 pages), Aug. 12, 2008.

(Continued)

*Primary Examiner* — Joseph Rocca
(74) *Attorney, Agent, or Firm* — King & Spalding L.L.P.

(57) ABSTRACT

A rear axle for a motor vehicle has two longitudinal links, each pivotally connected to a vehicle body, a cross member that connects the links to each other in the transverse vehicle direction and is coupled to each of the links in a rigid manner, and a Panhard rod extending substantially in the transverse direction that is joined on one end to a link or to the cross member, and on the other end to a joining point on the body side. The rear axle further has a longitudinal strut substantially extending in the longitudinal vehicle direction that is connected to the body at a forward end section in a rigid manner and forms the joining point for the Panhard rod on a free rear end section. The rear axle has an installation space requirement corresponding to a four-link rear axle.

18 Claims, 4 Drawing Sheets

U.S. PATENT DOCUMENTS

2002/0117816 A1 * 8/2002 Dudding et al. .......... 280/6.151

FOREIGN PATENT DOCUMENTS

| DE | 3135490 | 7/1982 |
| --- | --- | --- |
| DE | 3842339 | 6/1990 |
| DE | 60105095 | 9/2005 |
| DE | 102004041737 | 3/2006 |
| DE | 69833088 | 9/2006 |
| DE | 102006018641 | 12/2006 |
| EP | 0083217 | 7/1983 |
| EP | 0389363 | 9/1990 |
| EP | 0458665 | 1/1994 |
| FR | 2317115 | 2/1977 |
| FR | 2574347 | 6/1986 |

OTHER PUBLICATIONS

German Office Action for Application No. 10 2007 022 283.3 (4 pages) Mar. 3, 2008.

* cited by examiner

REAR AXLE FOR A MOTOR VEHICLE

CROSS-REFERENCE TO RELATED APPLICATIONS

This application is a U.S. National Stage Application of International Application No. PCT/EP2008/003166 filed Apr. 19, 2008, which designates the United States of America, and claims priority to German Application No. 10 2007 022 283.3 filed May 12, 2007, the contents of which are hereby incorporated by reference in their entirety.

TECHNICAL FIELD

The invention relates to a rear axle for a motor vehicle, comprising two longitudinal links, each pivotally connected to a vehicle body. a cross member that connects the longitudinal links to each other in the transverse direction of the vehicle, and that is coupled to each of the longitudinal links in a rigid manner, and a Panhard rod extending substantially in the transverse direction of the vehicle that is joined on one end to a longitudinal link or to the cross member and on the other end to a joining point on the vehicle body side.

BACKGROUND

In vehicles whose assembly is designed for a four-link rear axle a conventional torsion beam axle or a rear axle comprising a Panhard rod according to EP 0 458 665 may no longer be installed without extensive modifications of the rear part of the vehicle body due to space restrictions. However, four-link rear axles are very complex and therefore expensive.

SUMMARY

According to various embodiments, a cost effective rear axle can be provided which may be installed into a vehicle designed for a four-link rear axle without extensive modification effort regarding the vehicle body.

According to an embodiment, a rear axle for a vehicle may comprise two longitudinal links, each pivotally connected to a vehicle body, a cross member connecting the longitudinal links in a transverse direction of the vehicle and which is coupled to the longitudinal links in a rigid manner, and a Panhard rod substantially extending in a transverse direction of the vehicle, which is connected to a longitudinal link or the cross member with one end and to a joining point on the vehicle body side with another end, wherein a longitudinal strut substantially extending in a longitudinal direction of the vehicle which is connected to the vehicle body at a forward end section in a rigid manner and forms the joining point on the vehicle side for the Panhard rod at a free rear end section.

According to a further embodiment, the Panhard rod can be connected to an upper side of the free rear end section of the longitudinal strut. According to a further embodiment, a transverse strut can be provided which substantially extends in the transverse direction of the vehicle and is connected to the vehicle body at a first end section and is coupled to the end of the Panhard rod on the vehicle body side and/or the free end section of the longitudinal strut at a further free end section. According to a further embodiment, the Panhard rod can be connected to a lower side of the free end section of the transverse strut. According to a further embodiment, the Panhard rod can be connected to a vertical bearing axis on the vehicle body side by means of an articulated joint. According to a further embodiment, the longitudinal strut and the transverse strut may support a bearing journal of the Panhard rod joint on the vehicle body side. According to a further embodiment, the joining point of the Panhard rod on the vehicle body side can be arranged between wheel carriers opposite to each other with respect to the longitudinal direction of the vehicle and connected to the longitudinal links and/or the cross member. According to a further embodiment, the joining point of the Panhard rod on the vehicle body side can be arranged between wheel carriers opposite to each other with respect to the upright direction of the vehicle and connected to the longitudinal links and/or the cross member. According to a further embodiment, the transverse strut may comprise a middle section between its end sections which is downwardly offset with respect to the upright direction of the vehicle. According to a further embodiment, the cross member between the longitudinal links may comprise a middle section having a downwardly offset upper edge with respect to the upright direction of the vehicle. According to a further embodiment, the cross member may comprise a U-profile comprising two side plates and a connecting link, wherein the side plates have a reduced height in the middle section. According to a further embodiment, the bottom edges of the side plates of the cross member can be positioned in a horizontal plane when the axle is positioned in an upper end stop position. According to a further embodiment, one wheel carrier can be connected to one longitudinal link in each case and between a wheel carrier and a longitudinal link a bearing retainer for a vibration damper is formed in each case. According to a further embodiment, an axle trunnion can be connected to the wheel carrier. According to a further embodiment, the axle trunnion can eb attached by means of friction welding.

According to another embodiment, a method for manufacturing a rear axle as described above may comprise the steps of: assembling at first an axle body from the longitudinal links, the cross member and the wheel carriers and subsequently aligning the axle trunnions with respect to the axle body such formed and attaching the axle trunnions to the wheel carriers.

BRIEF DESCRIPTION OF THE DRAWINGS

Subsequently, the invention is described in more detail with reference to an exemplary embodiment illustrated in the drawings in which.

DETAILED DESCRIPTION

Figure 1:
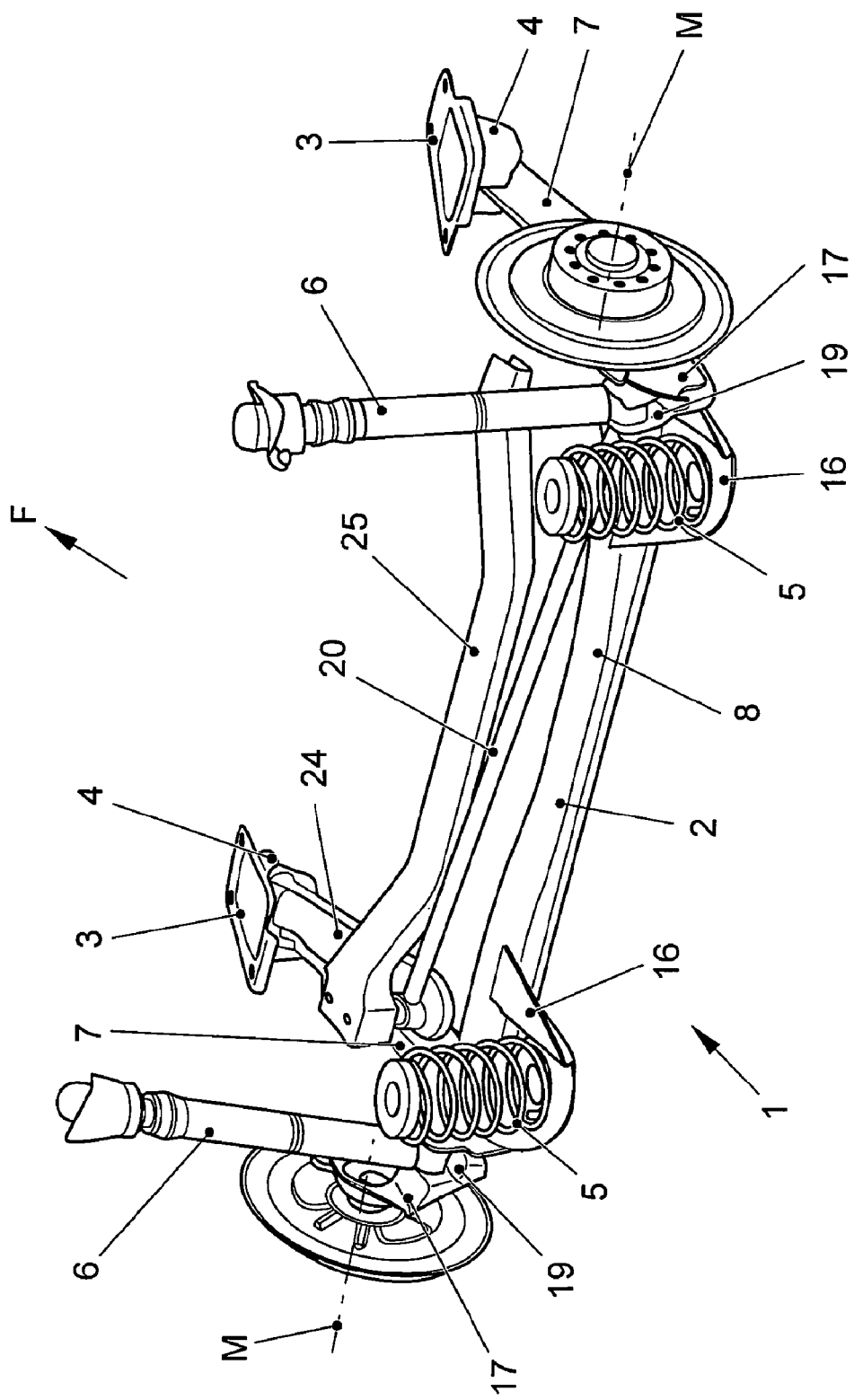
FIG. 1 is a view of an exemplary embodiment of a rear axle.

The rear axle according to various embodiments comprises two longitudinal links, each of which is pivotally connected to a vehicle body, a cross member that connects the longitudinal links to each other in the transverse direction of the vehicle and that is coupled to each of the longitudinal links in a rigid manner, and a Panhard rod extending substantially in the transverse direction of the vehicle that is joined on one end to a longitudinal link or to the cross member and on the other end to a joining point on the vehicle body side. The rear axle according to various embodiments further comprises a longitudinal strut substantially extending in the longitudinal direction of the vehicle that is connected to the vehicle body at a forward end section and that forms the joining point on the vehicle body side for the Panhard rod on a free rear end section.

Thereby, a cost effective and lightweight rear axle is formed, whose installation space requirement corresponds to a four-link rear axle. The rear axle according to various embodiments may thus alternatively be installed in vehicles whose design is laid-out for a four-link rear axle. In this connection at best very minor modifications are required to the rear part of the vehicle.

Preferably, a transverse strut is provided in addition, which substantially extends in a transverse direction of the vehicle, comprising a first end section connected to the vehicle body and a further free end section coupled to the end of the Panhard rod on the vehicle body side and/or the free end of the longitudinal beam. Thereby, a rugged absorption of forces in the longitudinal direction of the vehicle as well as in the transverse direction of the vehicle is allowed for.

According to an embodiment the Panhard rod is connected to a upper side of the free rear end section of the longitudinal strut.

Furthermore, the Panhard rod may be connected to a lower side of the free end section of the transverse strut.

Preferably, the Panhard rod is connected to a fixed bearing axis on the vehicle body side by means of an articulated joint. This articulated joint may be disposed between the end section of the longitudinal strut and the end section of the transverse strut.

According to another embodiment a bearing journal of the Panhard rod bearing on the vehicle body side is supported at the longitudinal strut as well as at the transverse strut.

With regard to the desired installation situation and with respect to the longitudinal direction of the vehicle and/or with respect to the upright direction of the vehicle the joining point of the Panhard rod on the vehicle body side is arranged between opposite wheel carriers connected to the longitudinal links and/or the transverse control arm. As compared to the rear axle configuration described in EP 0 458 865 B1 the joining point of the Panhard rod on the vehicle body side therefore is positioned considerably further to the rear.

It can be further advantageous in this connection, if the transverse strut comprises a middle section between its end sections which is offset downwardly in relation to the upright direction of the vehicle.

Correspondingly, also the cross member of the axle body may be formed comprising an upper edge between the longitudinal links of a middle section which is offset downwardly in relation to the upright direction of the vehicle. Thereby, the floor of the vehicle may be arranged comparatively far down in the area between the rear wheels, this is to say close to the roadway.

Preferably, the cross member has a U-profile comprising two side plates and a connecting link. There, the side plates have a reduced height in the middle section.

Furthermore, the bottom edges of the side plates of the cross member may be arranged thus that they are disposed in a horizontal plane when the axle is in an upper end stop position.

According to a further embodiment respective wheel carriers are each mounted to a longitudinal link, wherein between a wheel carrier and a longitudinal link a respective bearing retainer for a vibration damper is formed in each case. Hereby, a double-sided bearing retainer for a vibration damper may be provided by means of minor metal working.

According to a further embodiment an axle trunnion is mounted to the wheel carrier. The connection preferably is provided by means of friction welding. Hereby, very exact toe-in and camber values may be set.

Preferably, at first an axle body is assembled using the longitudinal links and the cross member including the wheel carriers. Subsequently, the axle trunnions at the axle body such formed may be aligned and mounted to the wheel carriers.

The exemplary embodiment illustrated in FIGS. 1 to 4 depicts a rear axle 1 for an automobile.

Rear axle 1 comprises an axle body 2 for supporting two vehicle wheels not illustrated in more detail. Axle body 2 is pivotally connected to a vehicle body, again not illustrated in more detail, about a substantially horizontal axis. FIG. 1 only shows the side brackets 3 on the vehicle body together with the respective bearing positions 4.

Furthermore, the axle body 2 is supported in the upright vehicle direction by means of two coil springs 5 at the vehicle body. Instead of the coil springs 5 illustrated other types of springs may be used. Positioned between the vehicle body and the axle body 2 are two vibration dampers 6, each of which is supported at the axle body 2 slightly behind the wheel centers M in relation to the forward driving direction F.

Figure 2:
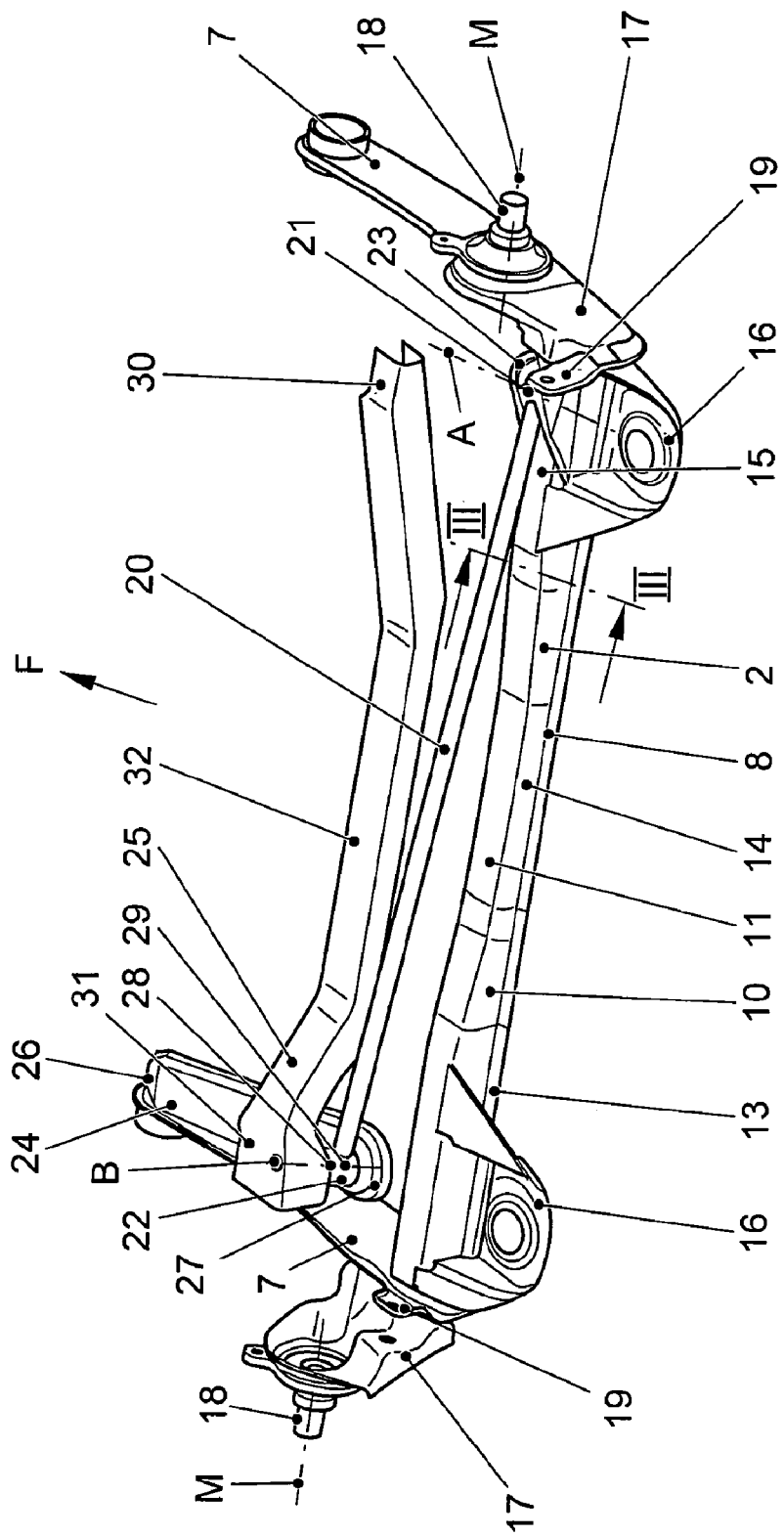
FIG. 2 is a another view of the rear axle of FIG. 1.

Axle body 2 comprises two longitudinal links 7 as well as cross member 8 connecting these. Each longitudinal link 7 is pivotally supported at a bracket 3 by a respective forward end, while the cross member 8 is coupled to a rear end section in a rigid manner. The cross member 8 extending in transverse direction of the vehicle herein is formed to be bending resistant, however, torsion flexible. As shown in FIG. 2 cross member 8 is connected to the longitudinal link 7 behind the wheel centers M, preferably welded on.

Figure 3:
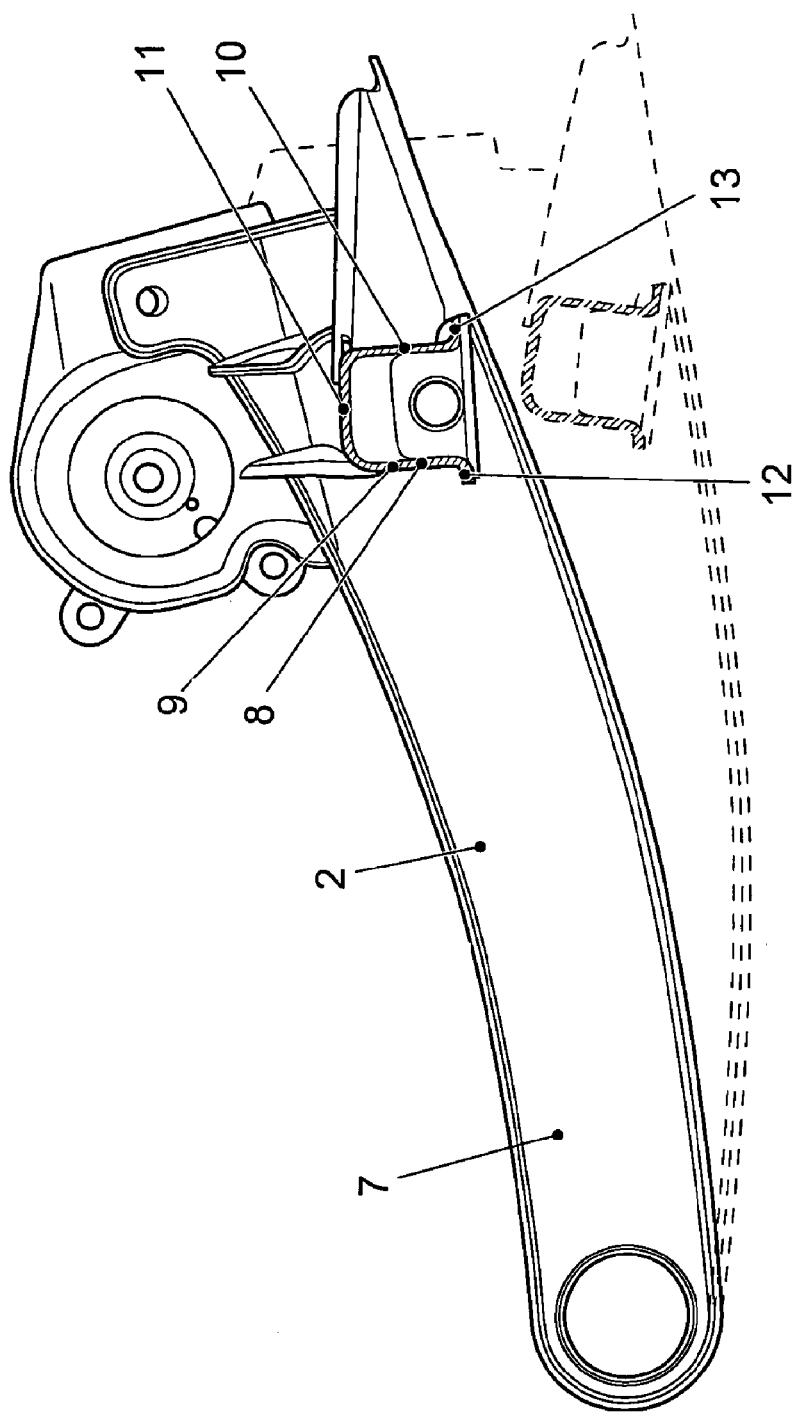
FIG. 3 is a cross-sectional view along line III-III of FIG. 2 without illustration of the Panhard rod.
Figure 4:
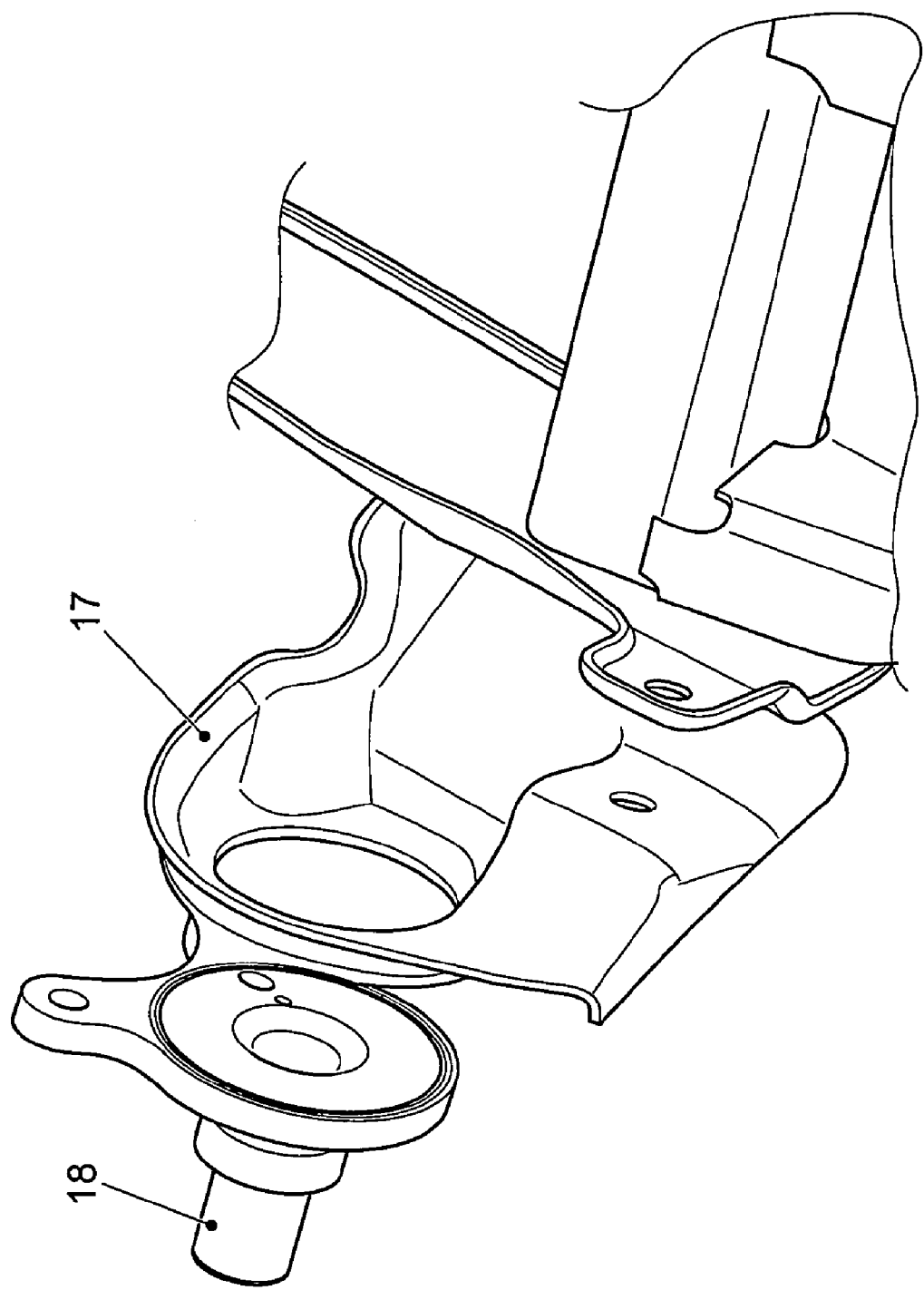
FIG. 4 is a spatial view in detail of the area of a wheel carrier prior to an attachment of an axle trunnion.

In the exemplary embodiment depicted cross member 8 is an element formed of sheet metal comprising a U-shaped section, which is formed by means of two side plates 9 and 10 and a connecting link 11 connecting the two side plates as shown in FIG. 3. At the same time the connecting link 11 defines the upper edge of the downwardly open cross member. When the rear axle 1 is in an upper stop position, this is to mean in a state of maximum spring compression, the U-shaped section is in a substantially horizontal position in which the bottom edges 12 and 13 of the side plates 9 and 10 of the cross member 8 are positioned in a horizontal plane. In a normal position, i.e. in the case of an empty vehicle, the lower side of cross member 8 is correspondingly slightly opened in forward driving direction F.

As further shown in FIG. 2 cross member 8 has a middle section 14 between the longitudinal links 7 comprising an upper edge which is downwardly offset with respect to the upright direction of the vehicle. For this purpose, the U-profile is completed comprising a reduced profile height in the middle section 14. The side plates 9 and 19 have a reduced height in the middle section 14 as compared to the end sections 15.

Welded to the cross member 8 are two spring seats 18, which stick out from the cross member 8 in a rearward direction, i.e. opposite to the forward driving direction F, and support the springs 5. The spring seats 16 located at the end sections 15 hereby each may be additionally supported at a longitudinal link 7 and be connected thereto by welding, for example, in order to stiffen the connection of the cross member 8 to the respective longitudinal link 7. For this, the longitudinal links 7 somewhat extend beyond the cross member 8 in the rearward direction.

In the area of the connection of the cross member 8 to the longitudinal links 7 axle body 2 further comprises two wheel carriers 17. The wheel carriers 17 also formed of sheet metal are attached to the longitudinal links 7 at the outside thereof and preferably are connected to the respective longitudinal links 7 by welding.

At each of the wheel carriers 17 an axle trunnion 18 is provided, which is connected to the wheel carrier 17 in the exemplary embodiment illustrated. During mounting, at first the axle body 2 consisting of the longitudinal links 7, the cross member 8 and the wheel carriers 17 is assembled. Only subsequently the axle trunnions 18 are attached. Before that these are aligned with respect to the axle body 2. Thereby, toe-in and camber values may be adjusted very exactly using little effort. Preferably, the attachment is carried out by means of friction welding.

Formed between a respective wheel carrier 17 and a longitudinal link 7 is a bearing retainer 19 for a vibration damper 8 preferably positioned to the rear of the wheel center M. For this purpose, at the longitudinal link 7 a upwardly sticking out lug may be formed which is provided with an insertion opening for a bearing journal or an attachment stud and which falls in line with a respective opening at the wheel carrier 17.

In order to support transverse forces a Panhard rod 20 is provided between the axle body 2 and the vehicle body. Panhard rod 20 substantially extends in the transverse direction of the vehicle and is connected to the cross member 8 at one end 21 and to a joining point on the vehicle body side at a further end 22.

For connecting to the axle body 2 a bracket 23 is provided on the upper side of the cross member 8 which is preferably arranged such that the connection of the Panhard rod is carried out to the rear of the wheel center M. The axis of rotation A of the articulated joint formed in conjunction with the bracket 23 substantially extends in the longitudinal direction of the vehicle. In principle, the bracket 23 may be formed integral with the cross member 8 or a spring seat 18. For this purpose, however, in the exemplary embodiment depicted one or more separate sheet metal elements are attached to the cross member 8 and welded thereto, respectively. However, it is also feasible to couple the axle-sided end 21 of the Panhard rod 20 to a longitudinal link 7.

The end 22 of the Panhard rod 20 on the vehicle body side is not directly mounted to the vehicle body, but to struts specifically attached thereto. In principle, this may be carried out using a single strut. In the exemplary embodiment depicted in FIGS. 1 and 2, however, a longitudinal strut 24 and a transverse strut 25 come into operation.

The longitudinal strut 24 substantially extending in longitudinal direction of the vehicle is connected to the vehicle body with a forward end section 28 in a rigid manner, while a free rear end section 27 forms the joining point for the Panhard rod 20 on the vehicle body side. With respect to the longitudinal direction of the vehicle the longitudinal strut 24 is attached to the vehicle body at about the height of the attachment of the axle body 2 to the vehicle body and extends to the rear below the vehicle floor at the inner side of the directly adjacent longitudinal link 7. Panhard rod 20 extends above the longitudinal strut 24 and preferably is connected to an upper side of the free rear end section 28 of the longitudinal strut 24. The corresponding articulated joint 28 is arranged in a sleeve 29 at the end 22 of the Panhard rod 20 and has a vertical bearing axis B, this is to mean an axis substantially extending in an upright direction of the vehicle.

The transverse strut 25 substantially extending in a transverse direction of the vehicle is connected to the vehicle body by means of a first end section 30 and coupled to the end 22 of the Panhard rod 20 on the vehicle body side by means of a further free end section 31. Here, the attachment to the vehicle body is carried out in the area of a wheel of the vehicle.

Accordingly, the transverse strut 25 shows a very small setting angle of 0° to a maximum of about 5° with respect to the transverse direction of the vehicle.

In the exemplary embodiment depicted the Panhard rod 20 is connected to a lower side of the free end section 31 of the transverse strut 25, such that the end 22 of the Panhard rod 20 on the vehicle body side is accommodated between the longitudinal strut 24 and the transverse strut 25. Accordingly, a bearing journal of the articulated joint 28 is supported on the longitudinal strut 24 as well as on the transverse strut 25.

However, it is also feasible to connect directly together the longitudinal strut 24 and the transverse strut 25 and to couple the Panhard rod 20 to one of these struts.

The joining point of the Panhard rod 20 on the vehicle body side formed by means of the longitudinal strut 24 and the transverse strut 25 is positioned between the opposite wheel carriers 17 with respect to the longitudinal direction of the vehicle as well as with respect to the upright direction of the vehicle.

As shown in FIGS. 1 and 2, the transverse strut 25 may be formed angulated when viewed from above, such that the Panhard rod 20 may be passed behind it with respect to the longitudinal direction of the vehicle.

Furthermore, transverse strut 25 extending below the vehicle floor has a middle section 32 between its end sections 30 and 31 which is offset downward with respect to the upright direction of the vehicle.

The rear axle 1 described above comprises an installation space requirement which corresponds to that of a for-link rear axle. Thereby, the rear axle described may be installed in a vehicle as an alternative for such a for-link rear axle without requiring extensive modifications at the vehicle body as they are required for conventional torsion beam axles and the like. As compared to a four-link rear axle, this results in a significantly reduced manufacturing and installation effort, whereby the rear axle 1 according to various embodiments allows for a significant cost reduction.

The invention has been described above in detail by means of an exemplary embodiment. However, it is not limited to that exemplary embodiment, but rather comprises all embodiments defined by the claims.

LIST OF REFERENCE SIGNS 1 rear axle
2 axle body
3 bracket
4 bearing
5 coil spring
6 vibration damper
7 longitudinal link
8 cross member
9 forward side plate
10 rear side plate
11 connecting link
12 forward bottom edge
13 rear bottom edge
14 middle section of the cross member
15 end section of the cross member
16 spring seat
17 wheel carrier
18 axle trunnion
19 bearing retainer
20 Panhard rod
21 axle-sided end of the Panhard rod
22 end of the Panhard rod on the vehicle body side
23 bracket 24 longitudinal strut
25 transverse strut
26 forward end section of the longitudinal strut
27 rear end section of the longitudinal strut
28 articulated joint
29 sleeve
30 end section of the transverse strut on the vehicle body side
31 free end section of the transverse strut
32 middle section of the transverse strut
A axis of rotation of the axle-sided bearing of the Panhard rod
B axis of rotation of the bearing of the Panhard rod on the vehicle body side
F forward driving direction
M wheel center

What is claimed is:

1. A rear axle for a vehicle, comprising:
   two longitudinal links, each pivotally connected to a vehicle body, a cross member connecting the longitudinal links in a transverse direction of the vehicle and which is coupled to the longitudinal links in a rigid manner,
   a Panhard rod substantially extending in a transverse direction of the vehicle, the Panhard rod having a first end connected at a first joining point to the cross member and a second end connected to a free rear end section of a longitudinal strut at a second joining point, the longitudinal strut and the longitudinal links being separate members,
   the longitudinal strut substantially extending in a longitudinal direction of the vehicle from the free rear end section connected to the Panhard rod to a forward end section rigidly connected to the vehicle body.

2. The rear axle according to claim 1, wherein a transverse strut is provided which substantially extends in the transverse direction of the vehicle and is connected to the vehicle body at a first end section and is coupled to the end of the Panhard rod on the vehicle body side and/or the free end section of the longitudinal strut at a further free end section.

3. The rear axle according to claim 2, wherein the Panhard rod is connected to a lower side of the free end section of the transverse strut.

4. The rear axle according to claim 2, wherein the transverse strut comprises a middle section between its end sections which is downwardly offset with respect to the upright direction of the vehicle.

5. The rear axle according to claim 1, wherein the Panhard rod is connected to a vertical bearing axis on the vehicle body side by means of an articulated joint.

6. The rear axle according to claim 5, wherein the longitudinal strut and the transverse strut support a bearing journal of the Panhard rod joint on the vehicle body side.

7. The rear axle according to claim 1, wherein the joining point of the Panhard rod on the vehicle body side is arranged between wheel carriers opposite to each other with respect to the longitudinal direction of the vehicle and connected to the longitudinal links and/or the cross member.

8. The rear axle according to claim 1, wherein the joining point of the Panhard rod on the vehicle body side is arranged between wheel carriers opposite to each other with respect to the upright direction of the vehicle and connected to the longitudinal links and/or the cross member.

9. The rear axle according to claim 1, wherein the cross member between the longitudinal links comprises a middle section having a downwardly offset upper edge with respect to the upright direction of the vehicle.

10. The rear axle according to claim 1, wherein the cross member comprises a U-profile comprising two side plates and a connecting link, wherein the side plates have a reduced height in the middle section.

11. The rear axle according to claim 10, wherein the bottom edges of the side plates of the cross member are positioned in a horizontal plane when the axle is positioned in an upper end stop position.

12. The rear axle according to claim 1, wherein one wheel carrier is connected to one longitudinal link in each case and between a wheel carrier and a longitudinal link a bearing retainer for a vibration damper is formed in each case.

13. The rear axle according to claim 12, wherein an axle trunnion is connected to the wheel carrier.

14. The rear axle according to claim 13, wherein the axle trunnion is attached by means of friction welding.

15. A method for manufacturing a rear axle according to claim 13, the method comprising the steps of:
   assembling at first an axle body from the longitudinal links, the cross member and the wheel carriers and subsequently aligning the axle trunnions with respect to the axle body such formed and
   attaching the axle trunnions to the wheel carriers.

16. A method for providing a rear axle for a vehicle, comprising:
   connecting each of two longitudinal links pivotally to a vehicle body,
   connecting the longitudinal links to each other in a transverse direction of the vehicle by a cross member coupled rigidly to each of the longitudinal links,
   directly connecting a first end of a Panhard rod substantially extending in a transverse direction of the vehicle to the cross member at a first joining point,
   directly connecting a second end of the Panhard rod to a free rear end section of a longitudinal strut at a second joining point, the longitudinal strut substantially extending in a longitudinal direction of the vehicle, the longitudinal strut and the longitudinal links being separate members, and
   connecting a forward end section of the longitudinal strut to the vehicle body in a rigid manner.

17. The method according to claim 16, further comprising the step of providing a transverse strut which substantially extends in the transverse direction of the vehicle and which is connected to the vehicle body at a first end section and is coupled to the end of the Panhard rod on the vehicle body side and/or the free end section of the longitudinal strut at a further free end section.

18. The method according to claim 17, wherein the Panhard rod is connected to a lower side of the free end section of the transverse strut.

* * * * *